Patented Jan. 26, 1932

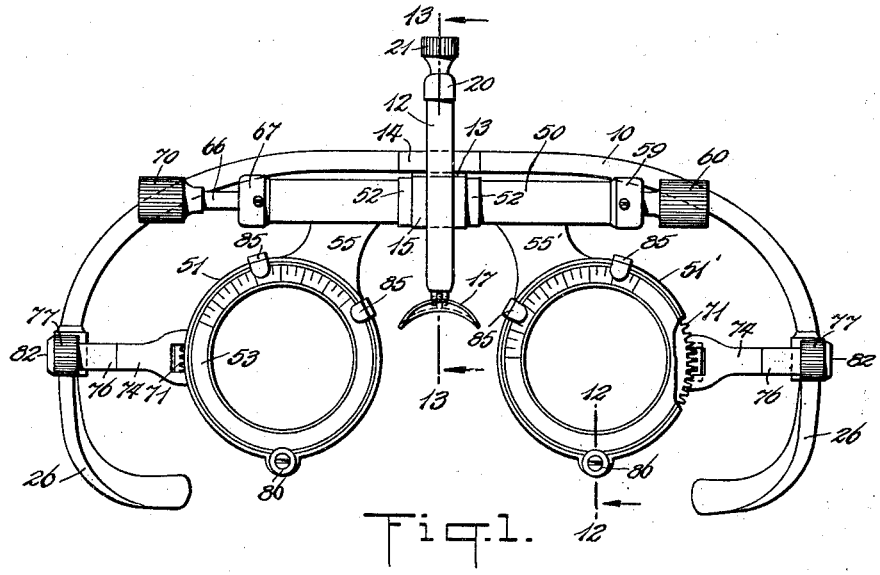
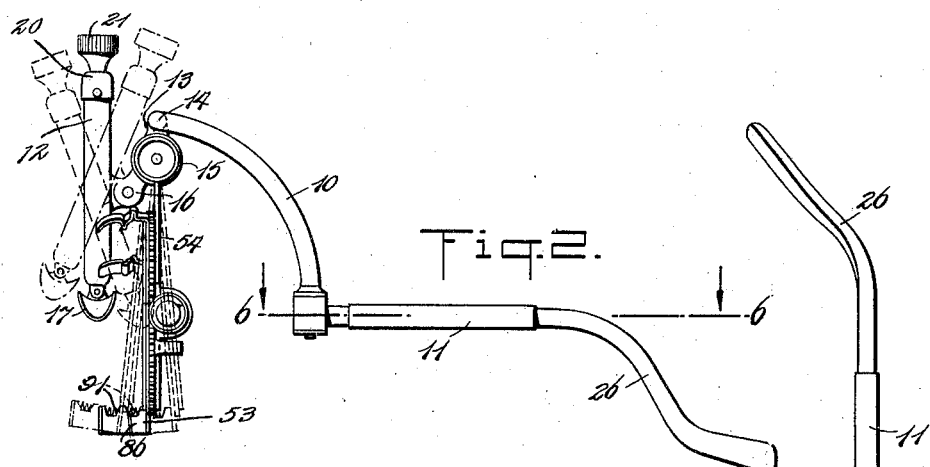
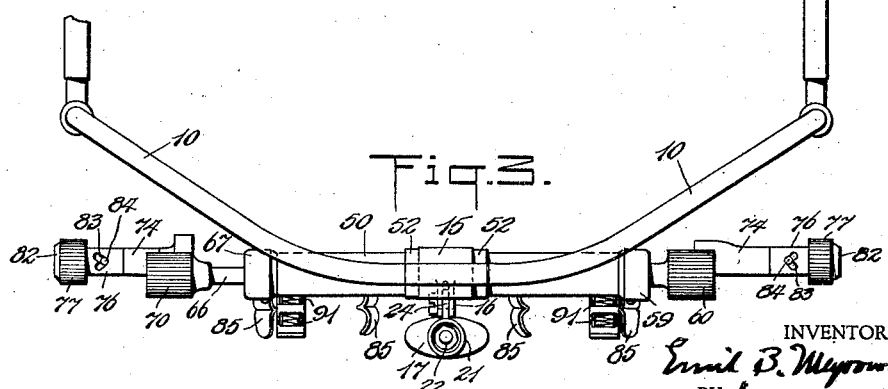

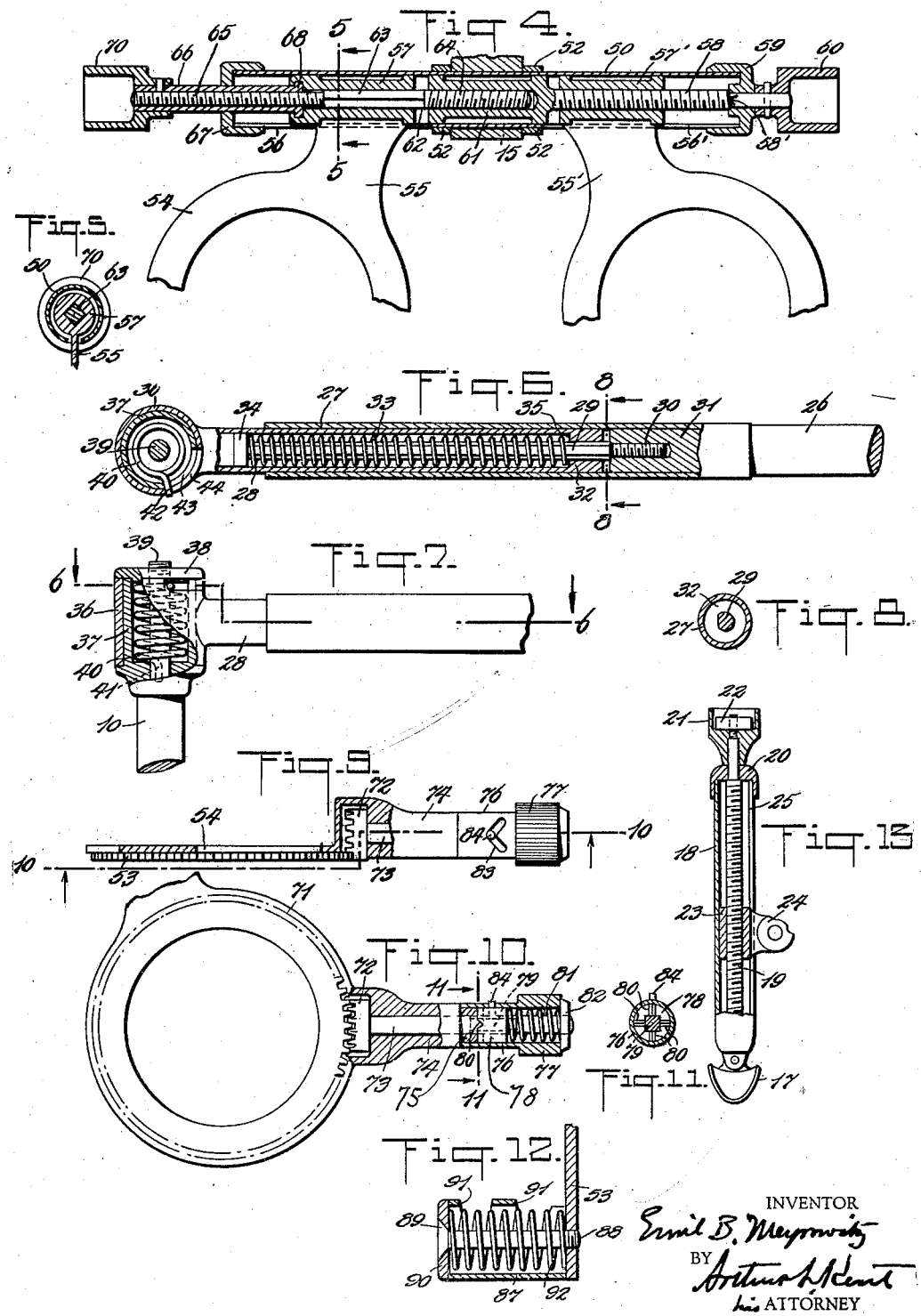

1,842,458

UNITED STATES PATENT OFFICE

EMIL B. MEYROWITZ, OF NEW YORK, N. Y., ASSIGNOR TO E. B. MEYROWITZ, INCORPORATED, OF NEW YORK, N. Y., A CORPORATION OF NEW YORK

SIGHT TRIAL FRAME

Application filed December 29, 1927. Serial No. 243,275.

This invention relates to sight trial frames for holding and adjusting lenses in front of a patient's eyes for the purpose of testing his vision, and aims to provide an improved device of this character by means of which the position of the lenses may be accurately adjusted and firmly held in an adjusted position.

Sight trial frames are ordinarily provided with adjustable lens carriers and with ear pieces and a nose piece for mounting the frame on the patient's face. Such sight trial frames have proved inconvenient because of the fact that strains transmitted to the supporting member of the frame from the ear pieces or nose piece have the effect of interfering with the proper and free operation of the means for adjusting the lens carriers. If the supporting member of the trial frames as heretofore made is sufficiently heavy and rigid to avoid this difficulty, the device becomes objectionably heavy. In accordance with this present invention, this difficulty has been overcome by providing a complete supporting frame with adjustable ear pieces and an adjustable nose piece and a separate frame secured to the first at one point only and carrying the adjustable lens carriers. Other features of the invention consist in providing both simultaneous and individual lateral adjustment of the lens carriers, an improved lens post, and improved means for the rotary adjustment of the lens holders.

In order that this invention may be clearly understood, I will describe in detail a specific sight trial frame embodying the invention which is shown in the accompanying drawings in which:

Fig. 1 is a front elevation;

Fig. 2 is a side elevation;

Fig. 3 is a top view;

Fig. 4 is a fragmentary front elevation of the lens frame on a larger scale showing in axial section the means for lateral adjustment of the lens holders;

Fig. 5 is a section on the line 5—5 of Fig. 4;

Fig. 6 is an enlarged section on the line 6—6 of Fig. 2 showing part of one of the ear pieces;

Fig. 7 is an inverted view of the connection of the inner end portion of one of the ear pieces showing parts broken away and parts in section;

Fig. 8 is a section on the line 8—8 of Fig. 6;

Fig. 9 is an enlarged plan view of the rotary adjustment means of one of the lens holders;

Fig. 10 is a section on the line 10—10 of Fig. 9;

Fig. 11 is a section on the line 11—11 of Fig. 10;

Fig. 12 is a section on the line 12—12 of Fig. 1 showing one of the lens posts; and Fig. 13 is a section on the line 13—13 of Fig. 1 showing the nose piece.

The device illustrated has a supporting frame which includes a practically rigid curved bar 10, ear pieces 11 adjustably secured to the ends of the bar 10, a fitting 13 fixed on the middle of the bar 10, and a nose piece 12 adjustably mounted on the fitting 13. The device has also a lens carrying frame which includes a practically rigid sleeve 50 and lens carriers 51, 51' adjustably mounted thereon in a manner hereinafter described. The lens carrying frame is secured to the supporting frame at one point only, namely, at the middles of the members 10 and 50, and the means for attaching the two frames together is of such character that the lens carrying frame may be turned with respect to the supporting frame independently of the adjustment of the adjustable parts 11, 12 of the supporting frame. The lens carrying frame may be turned not only for adjustment but also to swing it outward and upward to a position in which it is entirely out of the line of vision of the wearer.

The supporting frame will first be described. The fitting 13 includes a sleeve 14 fixed on the bar 10, a sleeve 15 below the sleeve 14, and a pair of studs 16 projecting from the sleeve 15. The nose piece 12 is adjustably mounted on the studs 16, and provision is made both for a forward and backward adjustment of its saddle 17 and an up and down adjustment thereof. As shown in Fig. 13, the nose piece includes a sleeve 18 to the lower end of which the saddle 17 is pivotally connected, and a screw rod 19 whose lower end is rotatably mounted in the lower end of the sleeve. The upper end of the sleeve 18 is covered by a cap 20 through which the upper end of the screw rod extends and above which is a knurled knob 21 for turning the screw rod. The knob is secured to the upper end of the screw by means of a nut 22. In the sleeve 18 and in threaded engagement with the screw 19 is a nut 23 having at its rear a projecting part 24 which passes through a longitudinal slot 25 in the sleeve 18 and extends between the studs 16 of the fitting 13 to which it is pivotally connected. Forward and backward adjustment of the saddle 17 is obtained by turning the entire nose piece about its pivotal connection to the fitting 13, while up and down adjustment is obtained by turning the knob 21 to move the screw 19 and sleeve 18 vertically with respect to the nut 23.

The ear pieces 11 extend rearwardly from the ends of the bar 10, and each has at its rear end a bow 26. A feature of the invention consists in means whereby the bows 26 are resiliently urged forwardly towards the bar 10 and inwardly towards each other. This results in urging the ear pieces both against the wearer's ears and against the sides of his head so as to hold the supporting frame firmly.

Each ear piece 11 has a straight telescopic portion consisting of an outer tube 27 extending from its bow 26 and an inner tube 28, (Fig. 6). Within the tubes is a rod 29 fixed with respect to the outer tube 27 by screwing a threaded projection 30 at the inner end of the rod into a threaded recess in the solid rear end 31 of the outer tube 27 formed by the end of the bow 26. The rod is of noncircular cross section and passes through a hole of similar section in the solid rear end 32 of the inner sleeve 28 (Fig. 8) to prevent relative turning of the two sleeves. A compression spring 33 reacting between an abutment 34 fixed on the front end of the rod 29, and an abutment 35 provided by an inner face of the solid rear end 32 of the inner sleeve, tends to draw the outer sleeve upon the inner sleeve and thus to urge the bow 26 toward the front end of the inner sleeve.

The front end of the inner sleeve 28 carries a vertical bearing sleeve 36 rotatably mounted on a vertical bearing sleeve 37 at the end of the bar 10 (Figs. 6, 7). The bearing sleeves are held together by a nut 38 screwed on a post 39 extending from the end of the frame member 10 within the sleeve 37. Within the bearing sleeve 37 and surrounding the post 39 is a torsion spring 40. One end 41 of this spring is fixed to the frame member 10, for example, by inserting it in a hole in the post 39. The other end 42 of the spring projects radially outward through arcuate slots 43 and 44 in the sleeves 37 and 36. The engagement between this end 42 of the spring and one end of the slot 44 in the sleeve 36 tends to rotate the sleeve 36 about the sleeve 37 in a clockwise direction as viewed in Fig. 6 to a limiting position, shown in Figs. 6 and 7, in which the end 42 of the spring comes in contact with the end of the slot 43 in the sleeve 37. Such rotation of the sleeve 36 on the sleeve 37 swings the ear pieces and their bows inwardly to the position shown in Figs. 1 and 3. The slots 43 and 44, which are most desirably a little less than 90° in length, thus permit a limited movement of the ear pieces and bows under the action of the springs sufficient for placing the bows and for holding them against the wearer's head and a further inward movement free from spring action to permit the ear pieces to be folded down against the supporting frame.

The lens carrying frame will next be described. Its rigid sleeve 50 extends through the sleeve 15 of the fitting 13 of the supporting frame and is held against sliding movement therein by collars 52. The sleeve 50 may be turned in the sleeve 15 to adjust the position of the lens carrying frame with respect to the supporting frame, and there is sufficient friction between these sleeves to hold the lens carrying frame in any position into which it may be turned. The lens carriers 51, 51' have ring shaped lens holders 53 rotatably mounted in non-rotary bearing rings 54 having upwardly projecting arms 55, 55' adjustably secured to the sleeve 50.

A feature of the invention consists in providing means by which either simultaneous or separate lateral adjustment of the lens carriers 51, 51' may be secured. The supporting arms 55, 55' of the lens carriers extend through longitudinal slots 56, 56' in the lower side of the sleeve 50 and are secured to slides 57, 57' within the sleeve (Fig. 4). A threaded shaft 58 extends through an internally threaded bore in the slide 57'. The outer end of the shaft 58 extends through a cap 59 at one end of the sleeve 50, and is provided with a knurled finger piece 60. This finger piece 60 and a shoulder 58' on the shaft engage the cap 59 to prevent longitudinal movement of the shaft in the sleeve 50. Fixed on the inner end of the shaft 58 is an internally threaded nut 61. A rod 62 has a squared portion 63 extending through a square hole in the slide 57 (Fig. 5). The inner end portion 64 of the rod 62 is threaded and in engagement with the nut 61. The outer end portion 65 of the rod 62 is threaded and engages an internal thread on a hollow shaft or sleeve 66 which extends through a cap 67 at the end of the sleeve 50. An external flange 68 on the inner end of the sleeve 66 engages an annular recess in the slide 57 near its outer end to prevent relative longitudinal movement between the sleeve and the slide while permitting rotation of the sleeve with respect to the slide. The sleeve 66 has at its outer end a knurled finger piece 70.

It should be noted that the rod 58 and slide 57' have right hand threads while the inner end 64 of the rod 63 and the nut 61 have left hand threads. It is essential that these two sets of cooperating screw threads be cut in opposite directions. It is not material whether the cooperating threads of the outer end 65 of the rod 63 and the sleeve 66 be right hand or left hand.

From the arrangement which has been described, it results that simultaneous lateral adjustment of the lens carriers may be obtained by turning the finger piece 60, while separate lateral adjustment of the carrier 51 may be obtained by turning the finger piece 70. In the first case turning the finger piece 60 and shaft 58 for simultaneous adjustment, the engagement between the threads of the shaft 58 and the threaded bore of the slide 57' moves the slide 57' inwardly or outwardly while a simultaneous inward or outward movement is given to the rod 62 by the threaded engagement between the inner end of this rod and the nut 61. In its longitudinal movement, the rod 62 carries with it the slide 57 because of the engagement between the outer portion 65 of the rod and the sleeve 66 and the engagement between the flange 68 of the sleeve and the slide 57. If, as is most desirable, the threads of the shaft 58 and the nut 61 be of the same pitch, the movements of the two lens carriers are equal, as well as simultaneous, and in opposite directions. When the finger piece 70 is turned for separate adjustment of the carrier 51, the turning of the sleeve 66 on the threaded outer portion 65 of the rod 62 causes a longitudinal movement of the sleeve which is imparted to the slide 57 by the flange 68.

Means are provided for rotary adjustment of the rotary lens holder 53 of each lens carrier. A feature of the invention consists in providing for this purpose adjusting means which automatically locks the rotary holder in any position and automatically unlocks it when an adjustment is to be made in either direction.

Each rotary lens holder 53 is provided on its periphery with a spur gear 71 which meshes with a crown gear 72 fixed on a shaft 73 which is journaled in a post 74 projecting laterally from the fixed bearing ring 54. The post 74 has an outer end portion 75 of reduced diameter over which fits the inner end of a sleeve 76 carrying a knurled knob 77. In the sleeve 76 is a slide 78 containing a square hole fitting on a squared portion 79 of the shaft 73 so as to prevent relative rotation of the slide and the shaft. The inner end of the slide 78 and the outer end of the post 74 are provided with locking means consisting of interlocking radial grooves and notches 80 which are normally urged into engagement with one another by a compression spring 81 reacting between the outer end of the slide 78 and a cap 82 fixed on the outer end of the shaft 73. The grooves and notches 80 serve to lock the slide and consequently the shaft 73 against turning and thus to lock the rotary holder 53 in any position to which it may be adjusted. To release this lock when adjustment is desired in either direction, the sleeve 76 is provided with a double or V-shaped cam-slot 83 which engages a pin 84 projecting radially outward from the slide 78. When the knob 77 is turned in either direction, the engagement between this cam-slot and the pin draws the slide 78 out of locking engagement with the end of the post 74. Further turning of the hand wheel rotates the slide and consequently the shaft 73 through the engagement of the cam-slot 83 with the pin 84. Such turning of the shaft 73, of course, turns the holder 53 through the gears 72 and 71. When the finger wheel is released, the spring 81 moves the slide 78 against the end of the post 74 to re-engage the locking means 80.

To provide for mounting one or more lenses in each lens holder, each holder 53 is provided with two double clips 85 and a lens post 86. This post is of peculiar construction and provides in a very simple manner for holding lenses of different thicknesses firmly in position in a lens holder. Each lens post 86 includes a sleeve 87 and a screw 88 having a head 89 engaging a cap plate 90 which engages the outer end of the sleeve 87 and holds the inner end of the sleeve firmly and squarely against the holder 53 when the post 86 is screwed into the holder. The sleeve 87 is provided with two arcuate slots 91, each extending through a little less than 180° and each of sufficient width to receive the edge of the thickest lens ordinarily used. Within the sleeve 87 and surrounding the screw 86 is a helical spring 92. The turns of this spring engage and grip the edges of any lenses which may be inserted through slots 91 and hold the lenses firmly in position in the lens holder.

The cross bar 10 of the supporting frame is curved backwardly and downwardly to conform to the front of wearer's head and to bring the point of connection of the ear pieces to the ends of the cross bar down substantially to the horizontal plane of the center of the lens holders when the frame is in use.

It is to be understood that the invention is not to be limited to the exact construction shown and to which the foregoing description has been largely confined, but that it includes changes and modifications within the claims.

What is claimed is:

1. A sight trial device, comprising a supporting frame having ear pieces and a nose piece for mounting it on the face of the wearer, and a separate lens carrying frame for carrying both lenses having adjustable lens carriers which is carried by the supporting frame.

2. A sight trial device, comprising a supporting frame having ear pieces and a nose piece for mounting it on the face of the wearer, and a separate lens carrying frame for carrying both lenses having adjustable lens carriers which is carried by the supporting frame and connected thereto at one point only.

3. A sight trial device, comprising a supporting frame having ear pieces and a nose piece for mounting it on the face of the wearer, and a separate lens carrying frame for carrying both lenses pivotally connected to the supporting frame.

4. A sight trial device, comprising a supporting frame having ear pieces, a nose piece adjustably secured to the supporting frame, and a lens carrying frame for carrying both lenses adjustably secured to the supporting frame and independent of the nose piece.

5. In a sight testing device, a supporting frame having a cross bar and ear pieces connected thereto, a fitting fixed on the middle of the said bar, a lens carrying frame adjustably pivoted on said fitting, and a nose piece pivoted on said fitting for adjustment independent of that of the lens carrying frame 6. In a sight testing device, a supporting frame having a cross bar, a fitting comprising a sleeve fixed on said bar and a second sleeve below said bar and a pivot bearing below the second sleeve, a nose piece mounted on said pivot bearing, and a lens carrying frame rotatably mounted in said second sleeve.

7. A sight trial frame having ear bows mounted for limited movement towards and away from the frame and towards and away from each other, resilient means tending to urge the ear bows towards each other, and separate resilient means tending to urge the ear bows forwardly.

8. A sight trial frame having a cross bar, ear pieces pivoted to the ends of said cross bar on vertical pivots, springs tending to turn said ear pieces toward each other, and means for limiting the angle of movement of the ear pieces through which the springs act thereon, further inward movement of the ear pieces being free from spring action.

9. In a sight trial frame having a cross bar and ear pieces, connections between the ends of the cross bar and the ear pieces, each comprising cooperating bearing sleeves having registering arcuate slots and fixed to the cross bar and ear pieces, respectively, a torsion spring within said sleeves having one of its ends fixed to the cross bar and its other end projecting radially outward through the registering arcuate slots in the sleeves.

10. In a sight trial frame, an ear piece having a bow and a straight telescopic portion comprising an inner tube and an outer tube, a tension rod secured at one end to the outer tube and extending into the inner tube through its inner end, and a compression spring within the inner tube between an abutment on the free end of the rod and an abutment on the inner tube and tending to reduce the length of the telescopic portion.

11. A sight trial frame, having a cross piece and lens carriers independently mounted thereon for lateral adjustment, means carried by the cross piece for simultaneous adjustment of said carriers inwardly and outwardly, and means carried by the cross piece for moving one of said carriers inwardly and outwardly independently of the other while the first said means is in position for simultaneous adjustment.

12. In a sight trial device, a cross piece, two lens carriers slidably mounted thereon, an actuating member, connecting mechanism connecting said actuating member with both lens carriers and arranged to move them in opposite directions when the actuator is moved, and means for moving one of said lens carriers independently with respect to said connecting mechanism while said actuating member is connected by said mechanism to both said carriers.

13. In a sight trial device having lens carriers, means for laterally adjusting the lens carriers either simultaneously or independently, comprising two independent slides carrying the two carriers, a rod slidably connected with one slide and held against rotation with respect thereto, a shaft having a threaded connection with the other slide, means for preventing longitudinal movement of said shaft, a nut carried by said shaft having a threaded engagement with said rod, a second shaft having an independent threaded engagement with said rod, a connection between said second shaft and the first slide permitting a relative turning movement and preventing relative longitudinal movement, means for turning said second shaft to effect lateral adjustment of the lens carrier carried by first slide, and means for turning the first-mentioned shaft to effect simultaneous lateral adjustment of the two lens carriers.

14. In a sight trial device, a lens carrier having a rotatably mounted lens holder, adjustment means for turning said holder, means for locking said holder against turning, automatic means for releasing said locking means when the adjustment means is turned in either direction, and automatic means for engaging said locking means when the adjustment means is released.

15. In a sight trial frame, a lens adjustment mechanism, comprising a fixed post, an adjustment shaft extending therethrough, journaled therein, and having a portion of non-circular cross section, a sleeve externally journaled on said post and containing a transverse V-shaped cam-slot, a slide lying within said sleeve and containing a non-circular hole engaging the non-circular portion of the shaft, cooperating locking means on the end of the post and inner surface of the slide, resilient means for urging the slide toward the post, and a pin fixed in the slide and extending through a cam slot of the sleeve so that turning of the sleeve in either direction moves the slide outward from the end of the post disengaging the locking means.

16. In a sight trial frame, a lens post comprising a sleeve containing an arcuate slot and a helical spring in said sleeve whose turns engage and grip the edge of a lens inserted through said slot.

17. A lens post, comprising a sleeve containing an approximately, semi-circular slot, an axial pin within the sleeve, and a helical spring in the sleeve and surrounding the pin whose turns are adapted to engage and grip the edge of the lens inserted through the slot.

18. In a sight trial device, a supporting frame comprising a cross bar which is curved rearwardly to conform to the front of the wearer's head and ear pieces connected to the ends of the cross bar, and a separate lens carrying frame carried by the supporting frame.

19. In a sight trial device, a supporting frame comprising a cross bar and ear pieces pivotally connected to the ends of the cross bar, and a separate lens carrying frame carried by the supporting frame, the cross bar of the supporting frame being curved backwardly and downwardly to conform to the front of the wearer's head and to bring the point of connection of the ear pieces to the ends of the cross bar down substantially to the horizontal plane of the center of the lens holders when the frame is in use.

In testimony whereof I have hereunto set my hand.

EMIL B. MEYROWITZ.